United States Patent
Sathyanarayana et al.

(10) Patent No.: US 10,330,508 B2
(45) Date of Patent: Jun. 25, 2019

(54) ULTRASONIC FLOWMETER USING WINDOWING OF RECEIVED SIGNALS

(71) Applicant: Texas Instruments Incorporated, Dallas, TX (US)

(72) Inventors: Amardeep Sathyanarayana, Austin, TX (US); Anand Dabak, Plano, TX (US); David Patrick Magee, Allen, TX (US)

(73) Assignee: TEXAS INSTRUMENTS INCORPORATED, Dallas, TX (US)

(*) Notice: Subject to any disclaimer, the term of this patent is extended or adjusted under 35 U.S.C. 154(b) by 267 days.

(21) Appl. No.: 14/964,172

(22) Filed: Dec. 9, 2015

(65) Prior Publication Data
US 2017/0167904 A1    Jun. 15, 2017

(51) Int. Cl.
*G01F 1/66* (2006.01)

(52) U.S. Cl.
CPC ............... *G01F 1/66* (2013.01); *G01F 1/662* (2013.01); *G01F 1/667* (2013.01)

(58) Field of Classification Search
CPC .......................................................... G01F 1/66
USPC ........................................................... 702/45
See application file for complete search history.

(56) References Cited

U.S. PATENT DOCUMENTS

| 9,002,665 B2 | 4/2015 | Karnad et al. | |
|---|---|---|---|
| 2007/0061093 A1* | 3/2007 | Angelescu | E21B 47/1015 702/100 |
| 2007/0084286 A1* | 4/2007 | Ajay | G01F 1/667 73/597 |
| 2010/0095782 A1* | 4/2010 | Ferencz | G01F 1/66 73/861.28 |
| 2013/0345994 A1* | 12/2013 | Wiklund | G01F 1/34 702/46 |

* cited by examiner

*Primary Examiner* — Ricky Ngon
(74) *Attorney, Agent, or Firm* — Ebby Abraham; Charles A. Brill; Frank D. Cimino

(57) ABSTRACT

A method of ultrasound flow metering includes applying a first and second pulse train to an ultrasound transducer pair ($T_1$, $T_2$) positioned for coupling ultrasonic waves therebetween. Responsive to the first pulse train applied to $T_1$, $T_1$ transmits an ultrasonic wave received as received ultrasonic wave ($R_{12}$) by $T_2$ after propagating through fluid in a pipe. Responsive to the second pulse train applied to $T_2$, $T_2$ transmits an ultrasonic wave received as received ultrasonic wave by ($R_{21}$) $T_1$ after propagating through the fluid. During the pulse trains, $R_{12}$ and $R_{21}$ build up in amplitude to provide excitation portions. The pulse trains are terminated, so that $R_{12}$ and $R_{21}$ decay as a damped free oscillation. Windowing is applied to $R_{12}$ and $R_{21}$ to generate windowed portions. A signal delay between $t_{12}$ and $t_{21}$ ($\Delta$TOF) is calculated using only windowed portions, and a fluid flow is calculated from the $\Delta$TOF.

17 Claims, 9 Drawing Sheets

ULTRASONIC FLOWMETER USING WINDOWING OF RECEIVED SIGNALS

FIELD

Disclosed embodiments relate to ultrasonic flowmeters, and more specifically to signal processing of ultrasound signals for fluid flow metering.

BACKGROUND

Ultrasonic flowmeters are commonly used to determine the flow rate for a variety of fluids (e.g., liquids, gases) flowing in pipes. Knowledge of the flow rate of the fluid can enable other physical properties or qualities of the fluid to be determined. For example, in some custody-transfer applications, the flow rate can be used to determine the volume (Q) of a fluid (e.g., oil or gas) being transferred from a seller to a buyer through a pipe to determine the cost for the transaction, where the fluid volume is equal to the flow rate multiplied by the cross-sectional area of the pipe and the time duration of interest.

Non-invasive clamp-on flow monitors for pipes are known, such as for water flow metering. A non-invasive flow monitor can be clamped to the outside of a pipe and secured thereto, using appropriate brackets and fasteners.

Invasive inline flow monitors for pipes are also known which are mounted within an intervening pipe section that joins to the adjacent pipe sections by a flange. One type of ultrasonic flowmeter employs transit time flow metering, where one or more pairs of ultrasonic transducers are attached to a pipe (or a spool piece attached to a pipeline), where each transducer pair includes a transducer located upstream with respect to the fluid flow and a transducer located downstream with respect to the fluid flow. Each transducer, when energized, transmits an ultrasonic beam or signal (e.g., a sound wave) along an ultrasonic path through the flowing fluid that is received by and is detected by the other transducer of the transducer pair. The path velocity (i.e., path or chord velocity (Vp)) of the fluid averaged along an ultrasonic path can be determined as a function of the transit time differential between the transit time of an ultrasonic signal traveling along the ultrasonic path from the downstream transducer to the upstream transducer, and the transit time of an ultrasonic signal traveling along the ultrasonic path from the upstream transducer to the downstream transducer.

There are two different measurement principles used in known transit time ultrasonic flowmeters. A first type of ultrasonic flowmeter is a direct path type that implements direct measuring crossed paths between transducer (sensor) pairs, where there are no reflectors needed. The ultrasonic transmitter and receiver for the direct-path type ultrasonic flowmeter are located in a linear configuration within the fluid flowing inside the meter pipe. A second type of ultrasonic flowmeter is a reflective path type that implements indirect measuring paths generally using at least one ultrasonic reflector mounted on the meter pipe inner wall opposite to the transducer pair to reflect the ultrasonic measurement signal received from the ultrasonic transmitter to the ultrasonic receiver, where the transducer pair is located at the same side of the meter pipe wall.

In operation, a pulse train excitation is generally used to excite one transducer of the transducer pair. A conventional way to process the received ultrasonic signal resulting from the pulse train excitation is to compute the zero crossings of the received signal from which the difference in transit time (or delta time of flight, $\Delta$TOF) between the upstream and downstream paths is calculated, which is used to compute the fluid flow.

SUMMARY

This Summary briefly indicates the nature and substance of this Disclosure. It is submitted with the understanding that it will not be used to interpret or limit the scope or meaning of the claims.

Disclosed embodiments recognize for fluid flow monitoring there is a need for accurate processing of received ultrasonic signals responsive to applied pulse train excitation. In disclosed methods of ultrasound flow metering and related processor integrated circuits (ICs) and ultrasonic flowmeters therefrom a pulse train including multiple (e.g., 20) pulses are transmitted (such as by an microcontroller unit (MCU)) to a transmit transducer that transmits an ultrasound signal, which is picked up by a receive transducer after passing through a fluid path referred to as a channel.

During the excitation period, the received signal builds up in amplitude, and given sufficient time builds up to a nominal steady state amplitude oscillating at the excitation frequency. Once the pulse excitations are stopped, the received signal at the receiving transducer decays at the resonant frequency of the entire system which is recognized to be temperature dependent, and to also be dependent on other variables including for fluid mixtures the concentration of component(s), and impurity level(s). Accordingly, to calculate the difference in propagation time between the downstream and upstream signals (or $\Delta$ time of flight (TOF)) defined as the time between $t_{12}$ and $t_{21}$, respectively, which enables a fluid flow to be calculated, wherein $t_{12}$ is a time for said ultrasonic wave to propagate from the first transducer ($T_1$) to the second transducer ($T_2$) and $t_{21}$ is time for the ultrasonic wave to propagate from $T_2$ to $T_1$, it is recognized $\Delta$TOF measurement accuracy can be improved by applying a window function for windowing the respective received ultrasonic waves ($R_{12}$) and ($R_{21}$) to generate windowed portions. In one embodiment the windowing of $R_{12}$ and $R_{21}$ passes only the excitation portion of $R_{12}$ and $R_{21}$, so that computation is performed only on the excitation portion of the received signals, and the decaying region (tail) is filtered out and is thus discarded.

BRIEF DESCRIPTION OF THE DRAWINGS

Reference will now be made to the accompanying drawings, which are not necessarily drawn to scale, wherein.

DETAILED DESCRIPTION

Figure 1:
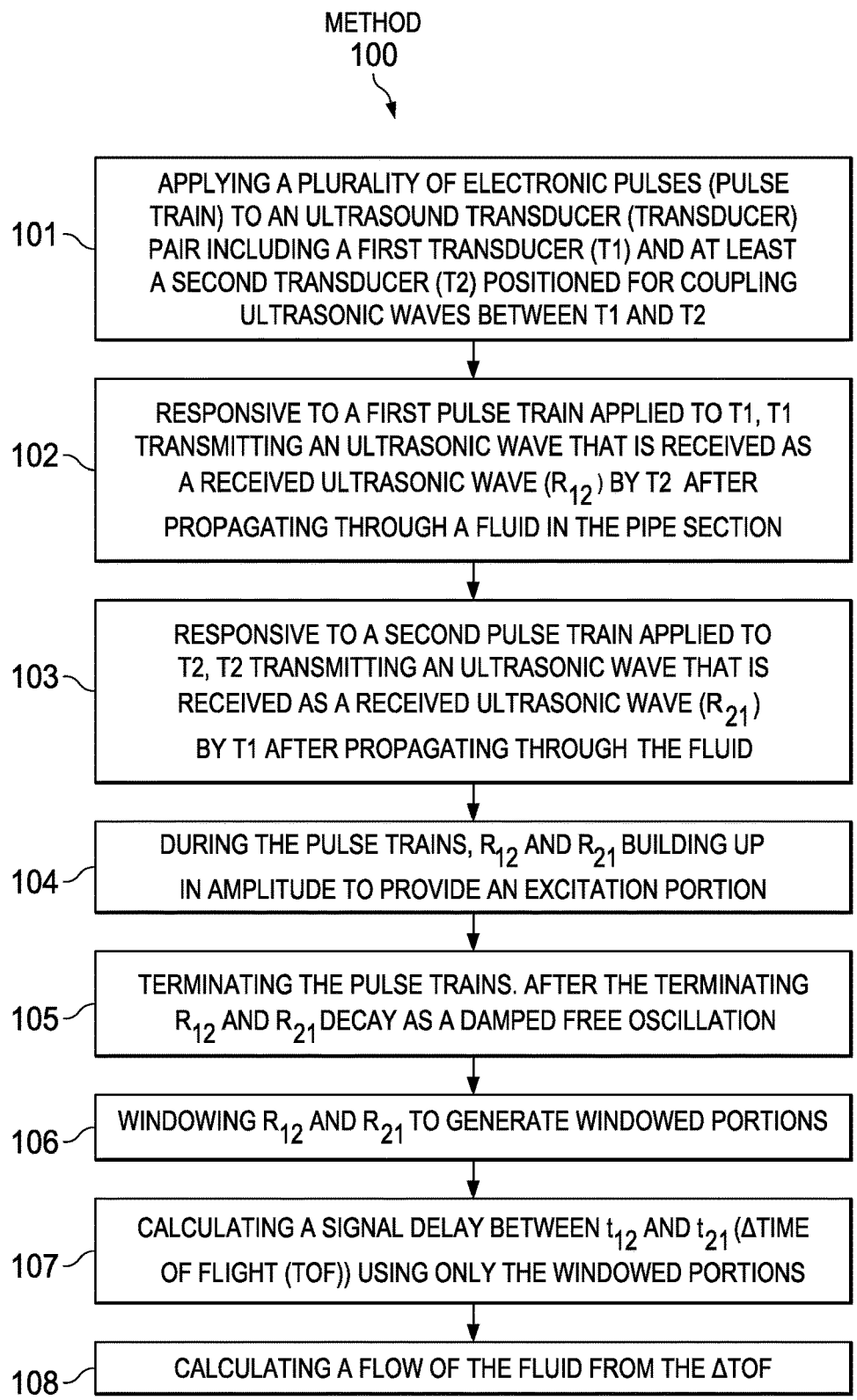
FIG. 1 is a flow chart that shows steps in an example method of ultrasound flow metering using windowing of the received ultrasonic signals, according to an example embodiment.

Example embodiments are described with reference to the drawings, wherein like reference numerals are used to designate similar or equivalent elements. Illustrated ordering of acts or events should not be considered as limiting, as some acts or events may occur in different order and/or concurrently with other acts or events. Furthermore, some illustrated acts or events may not be required to implement a methodology in accordance with this disclosure.

Also, the terms "coupled to" or "couples with" (and the like) as used herein without further qualification are intended to describe either an indirect or direct electrical connection. Thus, if a first device "couples" to a second device, that connection can be through a direct electrical connection where there are only parasitics in the pathway, or through an indirect electrical connection via intervening items including other devices and connections. For indirect coupling, the intervening item generally does not modify the information of a signal but may adjust its current level, voltage level, and/or power level.

FIG. 1 is a flow chart that shows steps in an example method 100 of ultrasound flow metering using windowing of the received ultrasonic signals, and calculating a signal delay using the windowed received ultrasonic signals, according to an example embodiment. Step 101 comprises applying a plurality of electronic pulses (pulse train) to an ultrasound transducer (transducer) pair including a first transducer ($T_1$) and at least a second transducer ($T_2$) positioned for coupling ultrasonic waves between $T_1$ and $T_2$. The transducers along with one or more optional ultrasonic reflectors can be within a pipe section to provide an inline flowmeter. The propagation path can be reflective (through the inner wall of the pipe reflecting or through added reflectors on the inner pipe wall) or direct (straight or diagonal). Alternatively, the transducers may be clamped on in a non-intrusive clamp-on arrangement.

The excitation frequency selected can be at or near the resonance frequency of the transducers. As used herein, near the resonant frequency of the transducers means within 5% of the resonant frequency. The result of selecting an excitation frequency at or near the resonance frequency of the transducers is recognized to improve the signal to noise ratio (SNR) of the received signals and to improve the performance (i.e. accuracy) of the TOF computations.

Step 102 comprises responsive to a first pulse train applied to $T_1$, $T_1$ transmitting an ultrasonic wave that is received as a received ultrasonic wave by $T_2$ (received signal $R_{12}$) after propagating through a fluid in the pipe section. Step 103 comprises responsive to a second pulse train applied to $T_2$, $T_2$ transmitting an ultrasonic wave that is received as a received ultrasonic wave by $T_1$ (received signal $R_{21}$) after propagating through the fluid. The first and second pulse trains are generally matching (the same) pulse trains.

Step 104 comprises during the pulse trains, $R_{12}$ and $R_{21}$ building up in amplitude to provide an excitation portion. Step 105 comprises terminating the pulse trains, wherein after the terminating $R_{12}$ and $R_{21}$ decay as a damped free oscillation which oscillates at a resonant frequency of the entire system, which as described above is recognized to be sensitive to temperature. The damped free oscillations can provide a tail portion (see FIG. 4B described below).

Step 106 comprises windowing $R_{12}$ and $R_{21}$ to generate windowed portions. Disclosed windowing is performed in the time domain. As known in signal processing, a window function provides windowing (also known as an apodization function or tapering function) by applying a mathematical function that is zero-valued outside of some selected interval to a signal of interest. For instance, a function that is constant inside the interval and zero elsewhere is referred to as a rectangular window, which describes the shape of its graphical representation. When another function or waveform/data-sequence is multiplied by a window function, the product is also zero-valued outside the interval, with the remaining signal being the part where they overlap. In one particular embodiment the windowing selectively removes the tail portion to only pass the excitation portion. The windowing can also remove unwanted portions of the received signal that are not part of the buildup and tail portions and to only select specific portions of the received signal waveforms.

Step 107 comprises calculating a signal delay between $t_{12}$ and $t_{21}$ (ΔTOF)) using only the windowed portions. As noted above $t_{12}$ is a time for the ultrasonic wave to propagate from $T_1$ to $T_2$ and $t_{21}$ is time for the ultrasonic wave to propagate from $T_2$ to $T_1$. ΔTOF=$t_{12}$−$t_{21}$, assuming $t_{12}$ is the downstream direction and $t_{21}$ is the upstream direction.

$$t_{12}=L/(c+v); t_{21}=L/(c-v), \Delta\text{TOF}=t_{12}-t_{21}$$

Where txy is the TOF from x to y, L is the distance between the transmit and receive transducers ($T_1$, $T_2$), c is the velocity of the ultrasonic/sound wave, and a is the velocity of measurand. Step 108 comprises calculating a flow of the fluid from the calculated ΔTOF. Two example calculation approaches are described below for determining ΔTOF shown below as ΔT:

Example Approach 1:
with knowing c as a function of temperature and the temperature of measurand ΔT can be determined with the equation below:

$$0 = v^2 + \frac{2L}{\Delta T}v - c^2$$

Example Approach 2:
No temperature measurement needed, only the calculation of the absolute time of flights $t_{12}$ and $t_{21}$:

$$v=L/2\times(1/t_{12}-1/t_{21})=L/2\times(t_{21}-t_{12})/(t_{21}t_{12})=L/2\times(\Delta T)/(t_{21}t_{12})$$

The Equations above are for flowmeters where the ultrasound wave travels in a straight line between the respective transducers. For the inline ultrasonic flowmeter 200 shown in FIG. 2 described below that operates with a ultrasound wave that does not travel in a straight line between the two transducers $T_1$ and $T_2$, one should replace L with L cos(Θ), where L is the distance travelled by the ultrasound wave between $T_1$ and $T_2$ and $\Theta$ is the angle between the path taken by the ultrasound wave and the line between $T_1$ and $T_2$.

Figure 2:
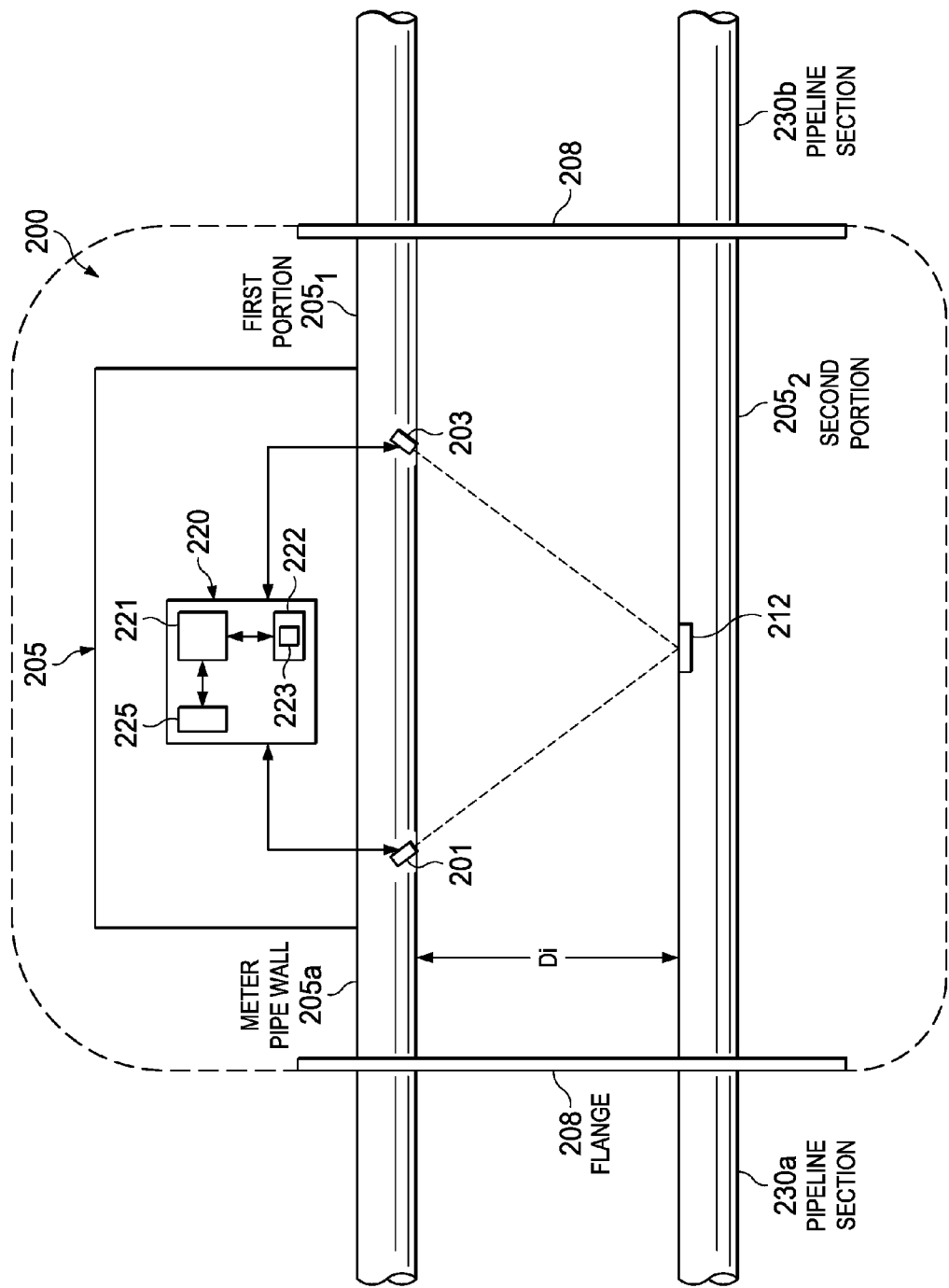
FIG. 2 depicts an example ultrasonic flowmeter shown installed between pipeline sections, according to an example embodiment.

FIG. 2 depicts an example inline ultrasonic flowmeter 200 shown installed between pipeline sections 230a and 230b including transducers 201 and 203 positioned on one side of the inner part of the meter pipe wall 205a along with an optional ultrasonic reflector 212, according to an example embodiment. The ultrasonic flowmeter 200 includes a meter body 205 including the meter pipe wall 205a. Connection flanges 208 are shown on each end of the ultrasonic flowmeter 200 for bolting the ultrasonic flowmeter 200 to the pipeline sections 230a and 230b.

Transducer 201 and 203 on first portion $205_1$ of the pipe meter wall 205a together provide a first transducer pair. The ultrasonic reflector 212 is generally positioned on the inner side of the meter pipe wall 205a and functions to increase the efficiency (ultrasonic signal intensity) of the reflective path for the transducer pair. The reflector 212 is generally in the conventional form of a metal plate.

The transducers 201, 203 have assembly angles and emission patterns for providing the desired measurement path shown as a V pattern. In another arrangement two spaced apart reflectors on the second portion $205_2$ allows a rectangular shaped measurement path (see FIG. 4A described below). The flow electronics module 220 is shown including a processor 221 and an associated memory 222 (e.g., static random access memory (SRAM)) that stores a disclosed flow measurement algorithm 223 that uses windowing, and a transceiver 225, which collectively provides an ultrasonic computer-based electronic flow measuring system that is coupled to the transducers 201, 203 for causing the one transducer to transmit ultrasonic signals and for analyzing received sensing signals generated by the other transducer to determine a volume flow of a fluid flowing through the ultrasonic flowmeter 200. As used herein, a transducer can include a separate transmitter and receiver. Other flow electronics module electronics, such as signal amplifiers, filters, an analog-to-digital converter (ADC, in the receive circuitry) and digital-to-analog converter (DAC, in the transmit circuitry) are generally part of flow electronics module 220, but are not shown to provide simplicity.

Ultrasonic flowmeter 200 can measure the flow velocity of the fluid flowing therethrough using the transit times of ultrasonic pulses, and flow electronics module 220 can calculate the flow rate at measurement conditions therefrom. Used is the fact that ultrasonic pulses travel faster in the direction with the flow than in the direction against the flow.

During operation, each of the transducers 201, 203 generally function as both an emitter (transmitter) and a receiver (at different times). Measurements are taken alternatively in both directions, so that after a transit time has been measured, an emitter becomes the receiver and vice versa. In this way, the impact of the speed of sound which depends on the fluid type, pressure and temperature is reduced.

Figure 3:
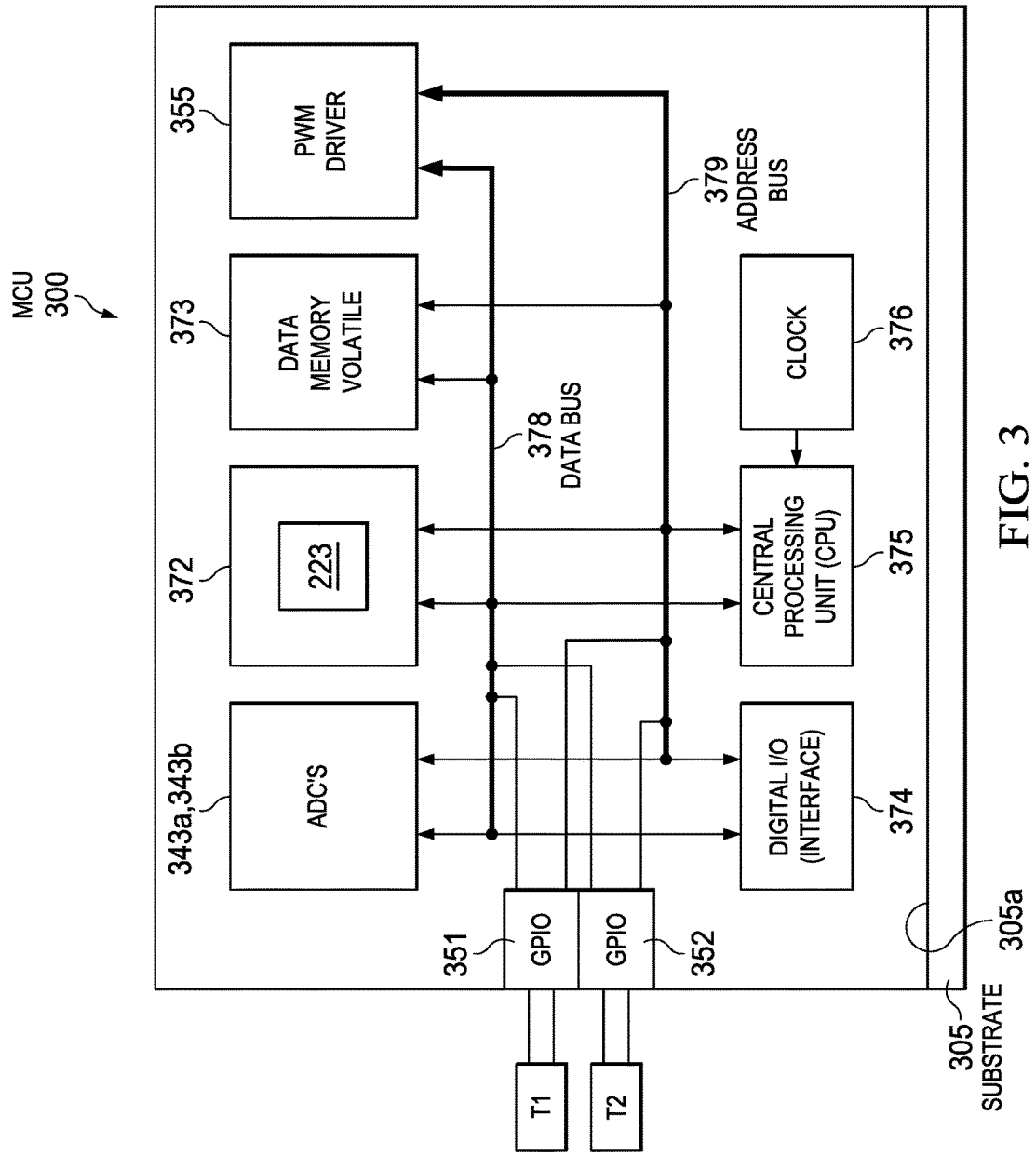
FIG. 3 shows an example monolithic mixed signal processor IC implementing a disclosed method of ultrasound flow metering using windowing of the received ultrasonic signals, according to an example embodiment.

FIG. 3 is a block diagram depiction of an example mixed signal processor IC shown as MCU 300 formed in and on a semiconductor surface 305a of a substrate 305 including a non-volatile memory 372 (e.g., flash memory) storing a disclosed flow measurement algorithm 223 that implements disclosed windowing of received ultrasonic signals, according to an example embodiment. On-chip flash memory is most often the source for all the instructions for the central processing unit (CPU or processor) 375. The processor IC 300 can comprise a microprocessor, digital signal processor (DSP) or the MCU shown. Although flow measurement algorithm 223 is shown as stored software in non-volatile memory 372 implemented by CPU 375, circuitry (i.e., hardware) on MCU 300 can be used in whole or in part to implement a disclosed flow measurement algorithm.

Although not shown, the processor IC 300 generally includes other integrated circuit modules, for example, a Universal Serial Bus (USB) controller and a transceiver. Processor IC 300 is shown also including ADC's 343a, 343b, PWM driver 355, volatile data memory 373, digital I/O (interface) 374, and clock (or timer) 376. Processor IC 300 is also shown including a digital data bus 378 and an address bus 379. There are general purpose input/output pins (GPIOs) 351, 352 which are coupled to the data bus 378 and to the address bus 379. The GPIOs 351, 352 are shown in FIG. 3 coupled to transducers $T_1$ and $T_2$, respectively, where $T_1$ and $T_2$ can be transducers 201 and 203 shown in the inline ultrasonic flowmeter 200 of FIG. 2.

Figure 4A:
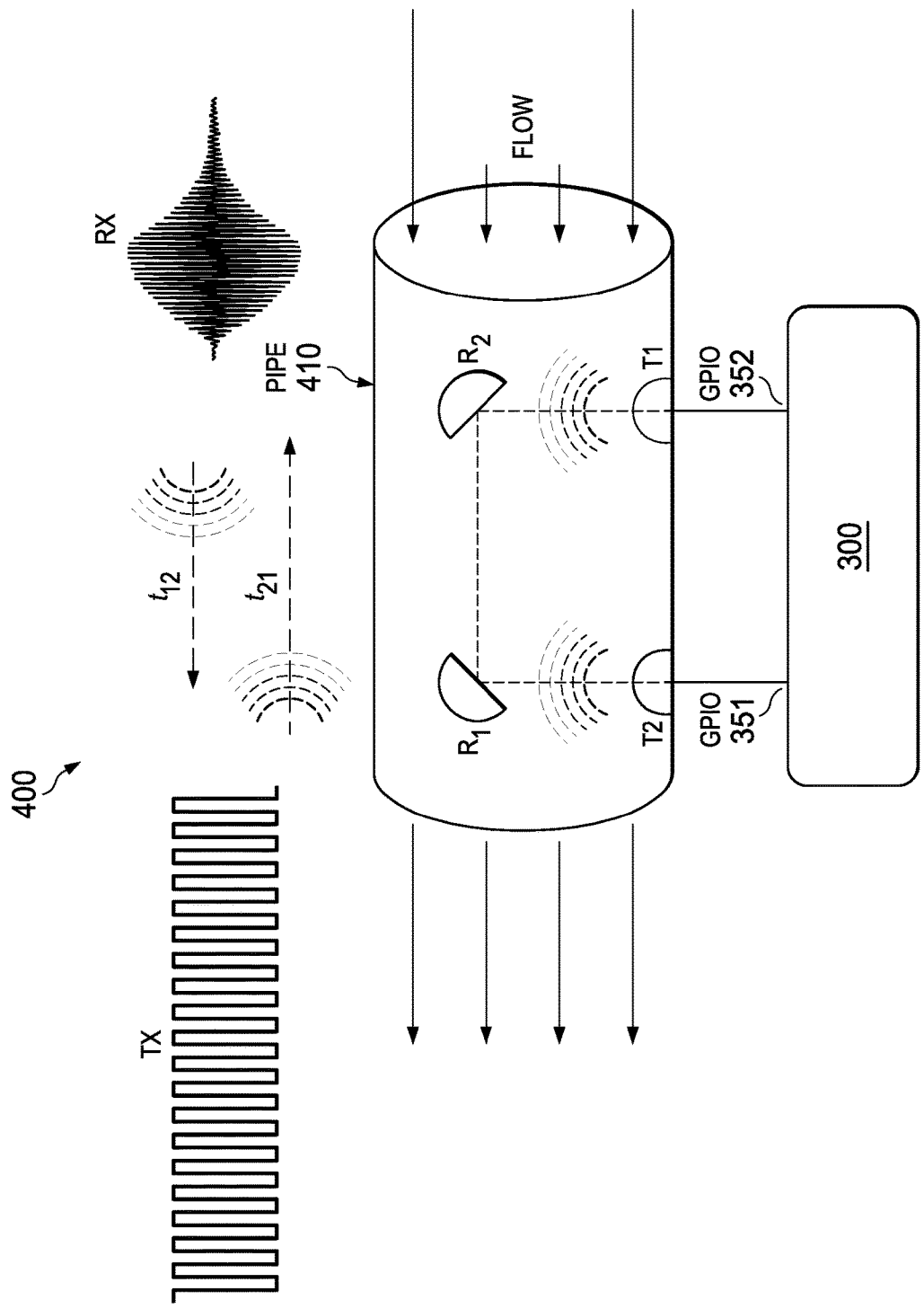
FIG. 4A depicts an example ultrasonic flowmeter including the MCU shown in FIG. 3 and a pipe section having transducers and reflectors within the pipe section with an example transmitted pulse train (TX) and the received signal (RX) after amplification and analog-to-digital (ADC) conversion shown above.

FIG. 4A depicts an example ultrasonic flowmeter shown as 400 including the MCU 300 shown in FIG. 3 and a pipe section 410 having transducers $T_1$ and $T_2$ and reflectors R1 and R2 within with an example transmitted pulse train (TX) and the received signal (RX) after amplification and ADC conversion described above. GPIO pins 351, 352 are in the coupling path between the MCU 300 and $T_1$ and $T_2$. When transducers $T_1$ and $T_2$ are excited by the pulse train TX at a frequency near the resonant frequency of $T_1$ and $T_2$ (e.g., 1 MHz), RX is received at the receiving transducer. RX is shown having an excitation portion which has a buildup in amplitude with time from the pulse train and the later in time tail portion which has an amplitude decaying with time.

Distinguishing features of disclosed embodiments include capture of the entire received waveform and correlating the upstream and downstream received ultrasound signals accurately to compute the $\Delta$TOF. To obtain the accurate $\Delta$TOF, the receive signal are windowed to generate windowed portions, in one particular embodiment so that only the excitation portion is selected. Advantages include due to windowing of received ultrasound data the $\Delta$TOF is accurately computed and variations in $\Delta$TOF to temperature changes are reduced because it is recognized the tail portion typically is governed by the natural frequencies of the transducers which are different. Furthermore, the natural frequencies of the transducers may change with temperature of the fluid medium, thus causing a drift in the $\Delta$TOF if the tail portion is also included in the TOF correlation calculation. Other benefits include reducing the computation needed for TOF calculation, and increasing the frequency for which the upstream/downstream signaling can occur as there is no need to wait for the tail amplitude to die down.

As used herein and by way of example and not by limitation, "hardware" can include a combination of discrete components, an integrated circuit, an application-specific integrated circuit, a field programmable gate array, a general purpose processing or server platform, or other suitable hardware. As used herein and by way of example and not by limitation, "software" can include one or more objects, agents, threads, lines of code, subroutines, separate software applications, one or more lines of code or other suitable software structures operating in one or more software applications or on one or more processors, or other suitable software structures. In one example embodiment, software can include one or more lines of code or other suitable software structures operating in a general purpose software application, such as an operating system, and one or more lines of code or other suitable software structures operating in a specific purpose software application.

EXAMPLES

Disclosed embodiments are further illustrated by the following specific Examples, which should not be construed as limiting the scope or content of this Disclosure in any way.

Figure 4B:
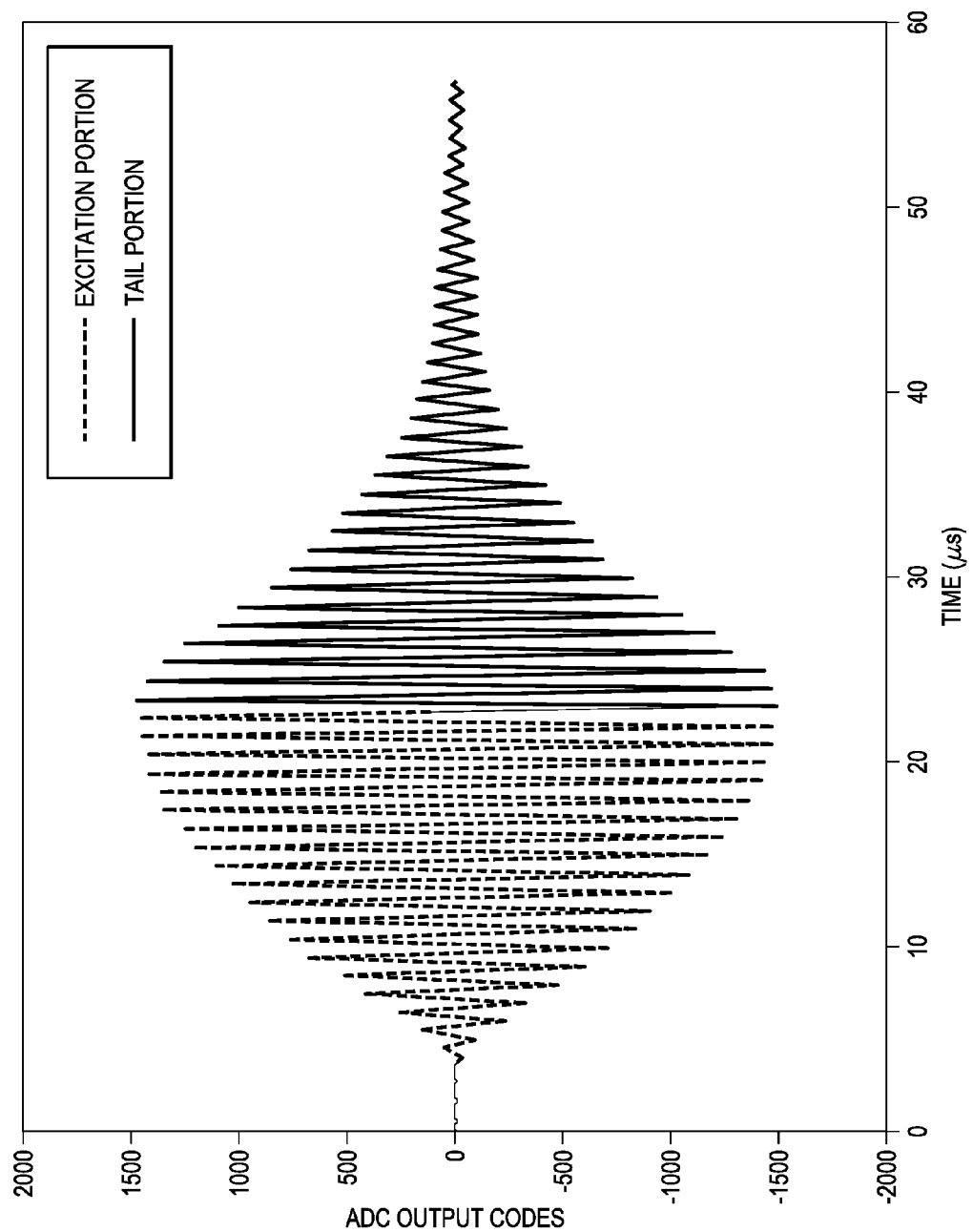
FIG. 4B show an expanded view of RX shown in FIG. 4A.

FIG. 4B show an expanded view of the RX shown in FIG. 4A. As shown in FIG. 4B, RX has two parts identified, an excitation portion which is the buildup of the pulses from an applied pulse train having 20 pulses corresponding to time about 5 to 23 µsec, and the later in time tail portion corresponding to time about 23 µsec to 55 µsec which is corresponds to the decay with free oscillations of the system. The tail portion is seen to freely oscillate in a damped amplitude pattern at system's resonance frequency. However, as noted above, the system's resonant frequency is dependent on the temperature of the fluid medium, and can include other dependencies such as the concentration of one component in a fluid mixture in the case of fluid mixtures.

Figure 4C:
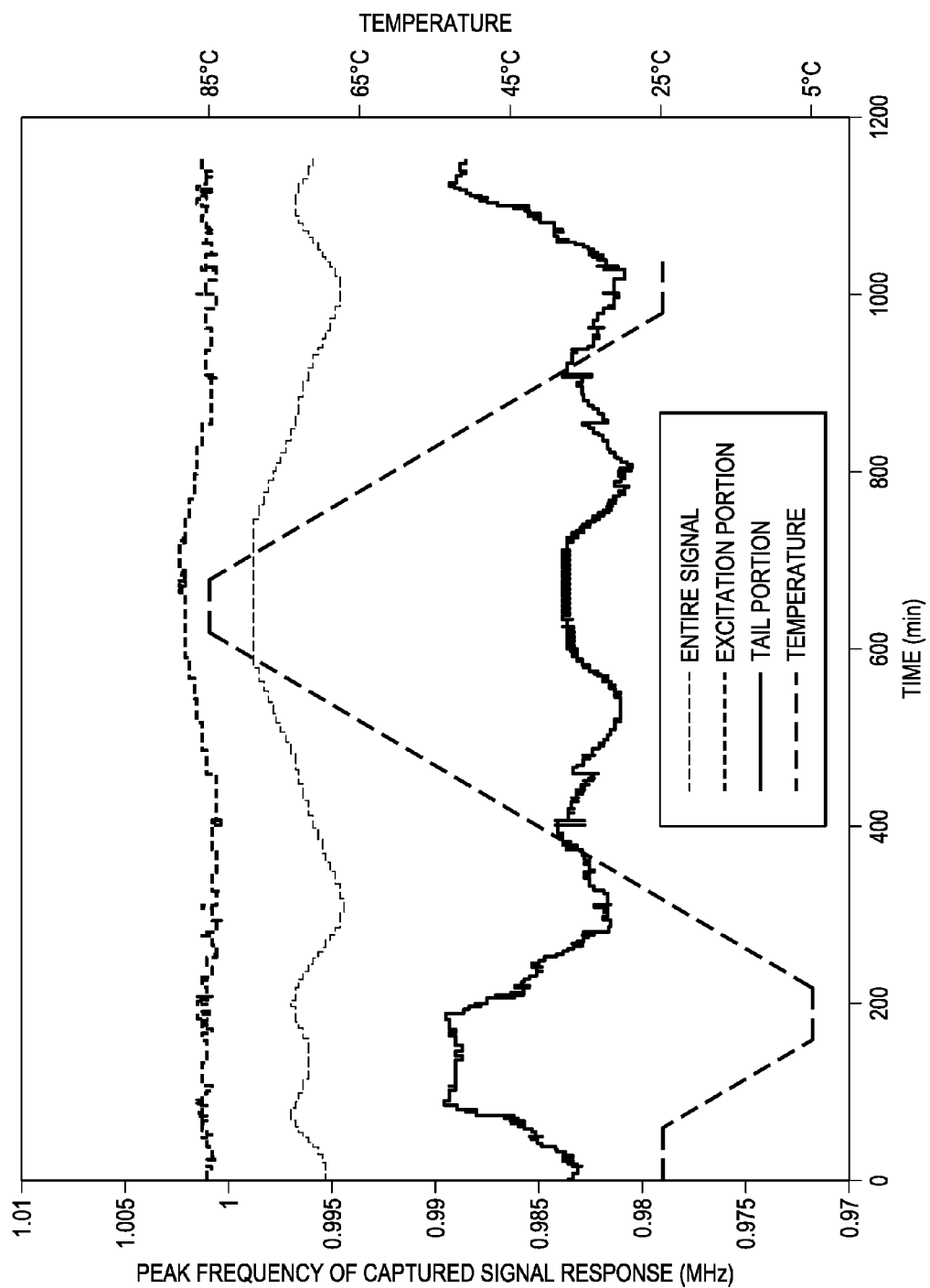
FIG. 4C shows an evaluation of the peak frequency (in MHz) of the RX signal at zero fluid flow, and across a range of temperatures from about 5° C. to 85° C.

FIG. 4C shows an evaluation of the peak frequency (in MHz) of the RX signal at zero fluid flow, and across a range of temperatures from about 5° C. to 85° C. As shown in FIG. 4C the tail portion of RX has significantly more temperature dependence as compared to the excitation portion of the received signal. Hence using entire data (excitation portion plus the tail portion) for signal processing makes the results more dependent on the temperature of channel.

Figure 5A:
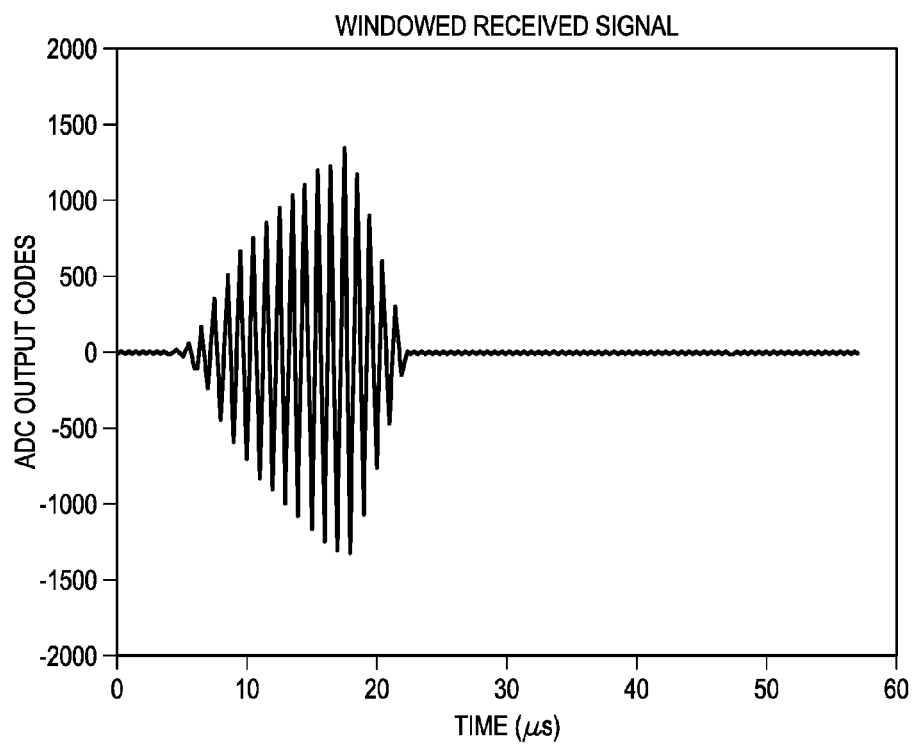
FIG. 5A shows an excitation portion after the windowing that filtered out entire tail portion of the signal shown in FIG. 4B.
Figure 5B:
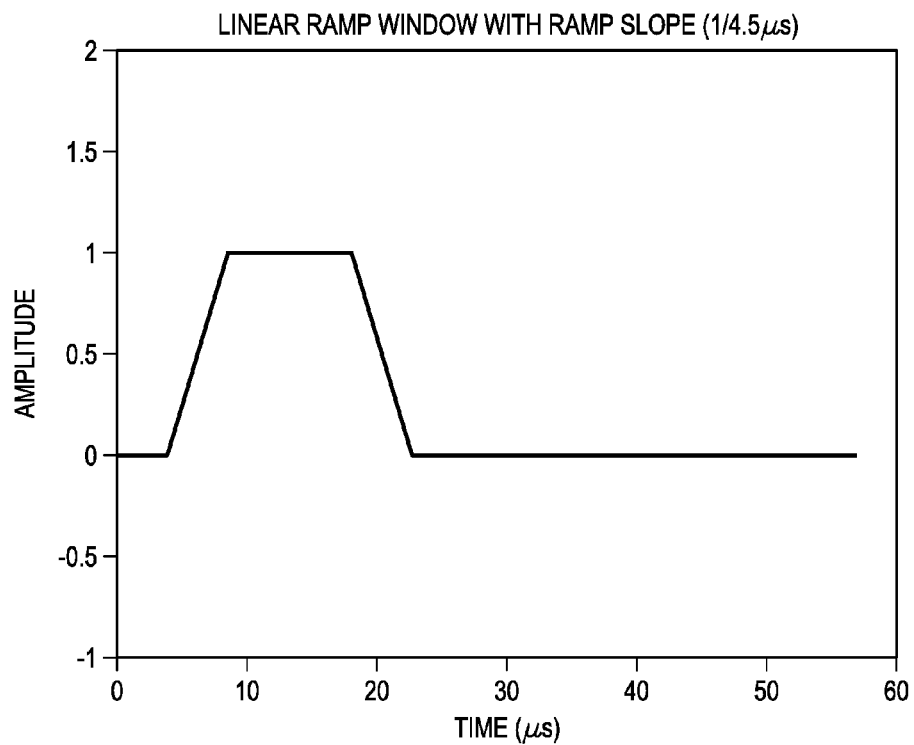
FIG. 5B shows an example linear tapering window shown as a trapezoidal window having a linear ramp.

To reduce the temperature dependence on the computation and the resulting impact on ΔTOF, as described above, windowing of RX is used to generate windowed portions, such as in one particular embodiment to only use the excitation region of the RXs for further processing. As noted above, the excitation region naturally decays in amplitude over time in the tail portion. Hence RX can be windowed by a suitable window function to extract the excitation portion and filter out other portions, such as the entire tail portion as shown in FIG. 5A. A rectangular (short rise and fall time) window can be used, however abrupt termination of the excitation part can result in high frequency ringing of the resulting windowed signal. To avoid ringing, a smoother window such as Hanning (or Hann) window can be used. The Hanning window ($\omega(n)$) is given by:

$$\omega(n) = 0.5\left(1 - \cos\left(\frac{2\pi n}{N-1}\right)\right)$$

where the ends of the cosine just touch zero, so the sidelobes roll off at about 18 dB per octave. For a low complexity computation, a linearly tapering window, shown as a trapezoidal window having a linear ramp window with a ramp slope as shown in FIG. 5B can be used to smooth out the edges instead of a sharp (fast rise time) rectangular window.

Figure 6A:
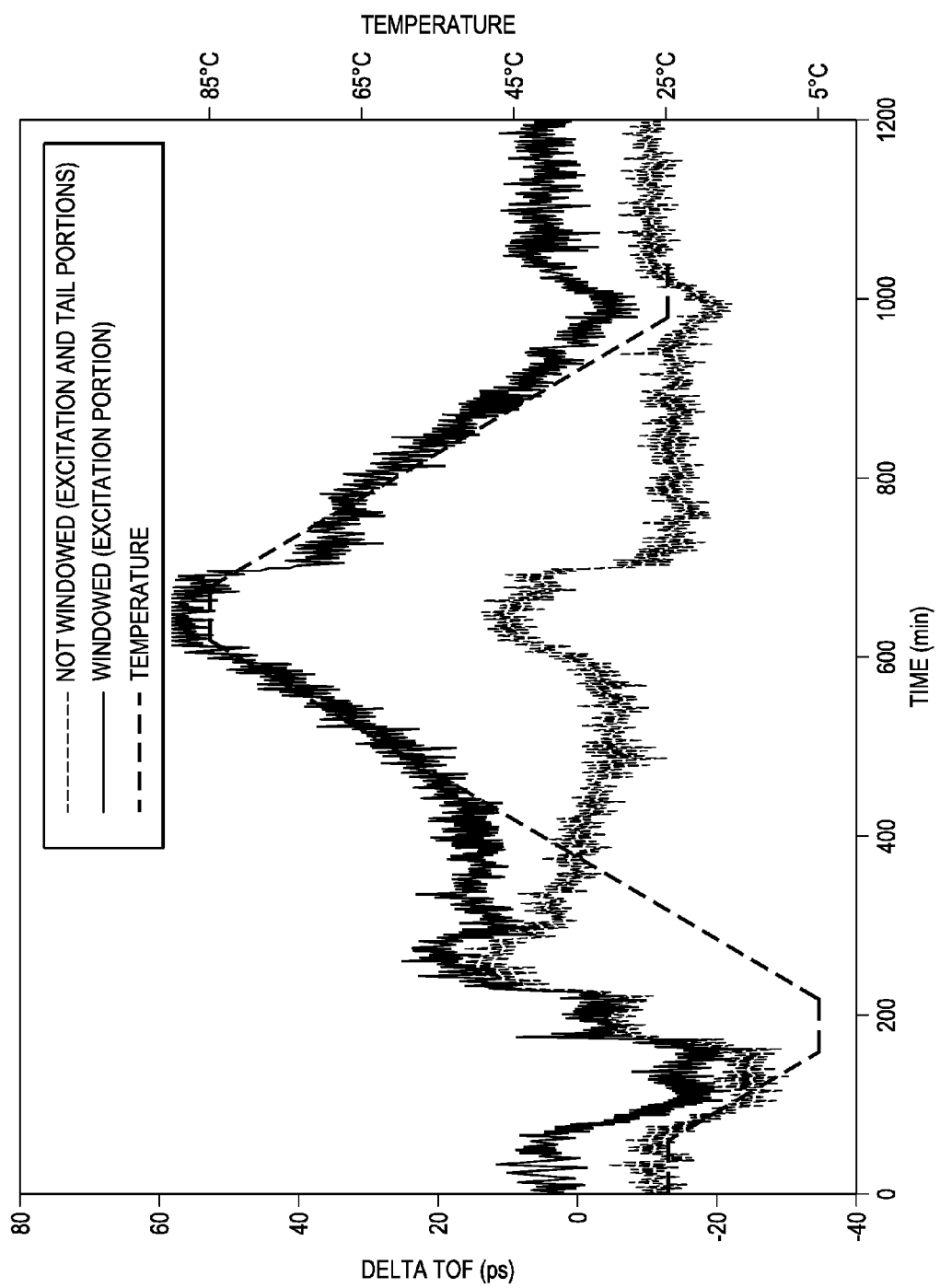
FIG. 6A and FIG. 6B show the ΔTOF at zero flow for 2 different water flow meters computed using both disclosed windowing (only the excitation portion) and with no-windowing (excitation portion and the tail portion) of the received signal.
Figure 6B:
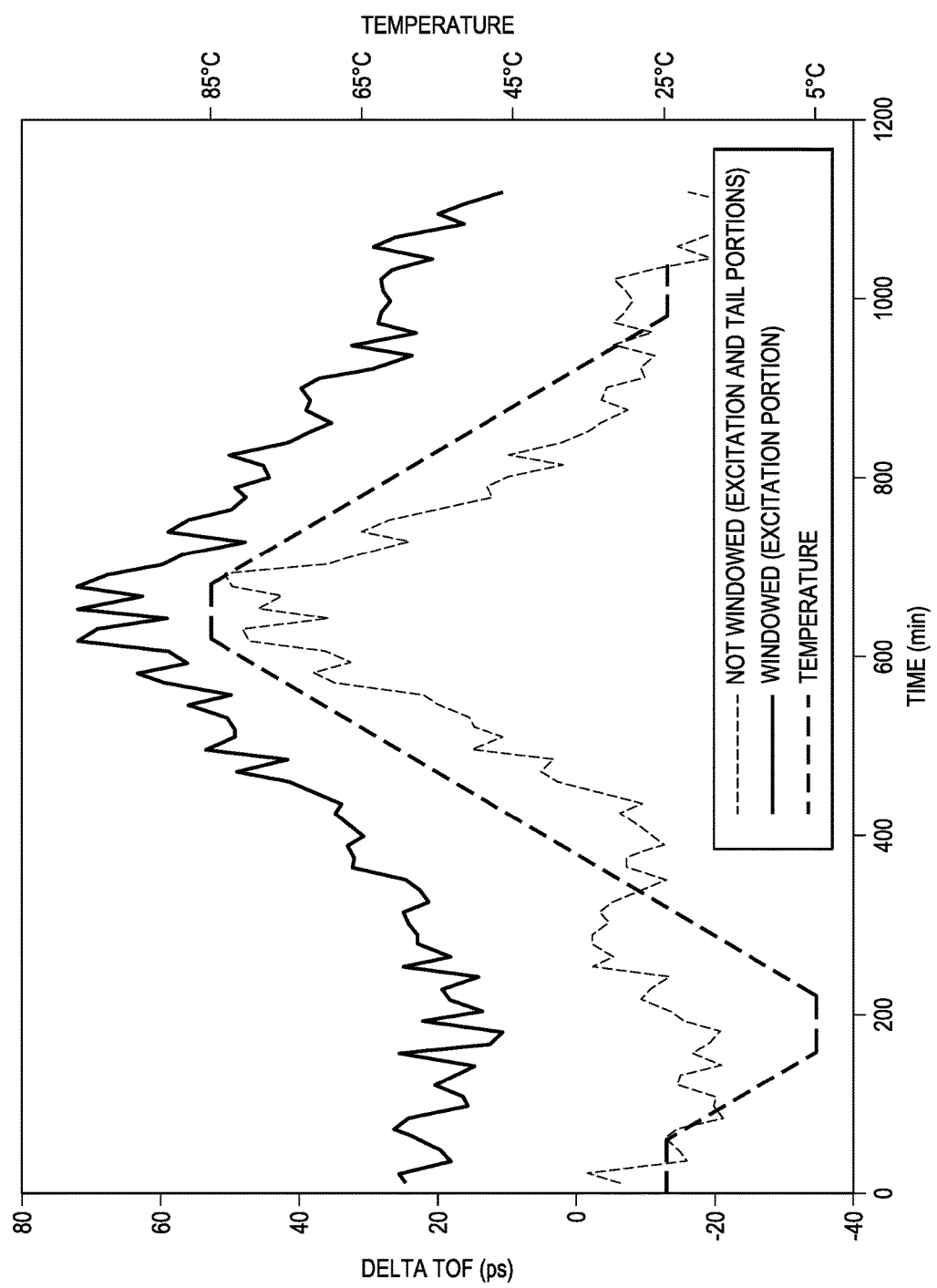

FIG. 6A and FIG. 6B show the ΔTOF result at zero flow for 2 different water flow meters computed using both disclosed windowing (resulting in the windowed RX having only the excitation portion) and known non-windowed (RX has both the excitation portion and the tail portion) of RX. It can be clearly seen from both FIGS. 6A and 6B that the results from the windowed RX (excitation portion only) on both the flowmeters follow the temperature profile which as described above improves the accuracy of the TOF calculation. This behavior is not the case for the known non-windowed results (RX having the excitation portion and tail portion). Although it appears the results using non-windowed RX is better in flowmeter as shown in FIG. 6A, because the ΔTOF is neither independent nor tracking the temperature profile shown, the results are not reliable being dependent on the channel conditions, particularly the fluid temperature.

Those skilled in the art to which this disclosure relates will appreciate that many other embodiments and variations of embodiments are possible within the scope of the claimed invention, and further additions, deletions, substitutions and modifications may be made to the described embodiments without departing from the scope of this disclosure. For example, by applying a threshold on the RX signal and capturing zero crossings only in the excitation region, it is possible to compute the phase difference and ΔTOF. However the accuracy of this arrangement may be affected by the noise floor and the signal to noise ratio (SNR).

The invention claimed is:

1. A method of ultrasound flow metering, comprising:
receiving, by a first transducer, a first pulse train from a flow electronics circuit;
transmitting, by a first transducer, a first ultrasonic wave to a second transducer, the first ultrasonic wave propagating downstream through a fluid in a pipe section in response to receiving the first pulse train, wherein an amplitude of the first ultrasonic wave increases when receiving the first pulse train;
receiving, by the second transducer, a second pulse train from a flow electronics circuit;
transmitting, by the second transducer, a second ultrasonic wave to the first transducer, the second ultrasonic wave propagating upstream through the fluid in the pipe section in response to receiving the second pulse train, wherein an amplitude of the second ultrasonic wave increases when receiving the second pulse train;
receiving, by the first transducer, the second ultrasonic wave from the second transducer;
receiving, by the second transducer, the first ultrasonic wave from the first transducer;
generating, by the flow electronics circuit, a first windowed portion of the first received ultrasonic wave and a second windowed portion of the second received ultrasonic wave;
calculating, by the flow electronics circuit, a signal delay using the first and second windowed portion; and
calculating, by the flow electronics circuit, a flow of the fluid from the calculated signal delay.

2. The method of claim 1, wherein generating the first and second windowed portions comprises using a linearly tapered window.

3. The method of claim 1, wherein generating the first and second windowed portions comprises using a Hanning window.

4. The method of claim 1, wherein the fluid comprises water.

5. The method of claim 1, wherein the first and second transceiver are spaced apart from one another along a first pipe wall of an inline pipe section.

6. The method of claim 1, wherein:
the amplitude of the first ultrasonic wave decreases when not receiving the first pulse train to form a tail portion of the first ultrasonic wave, and
generating the first windowed portion selectively removes at least a section of the tail portion.

7. The method of claim 1, wherein an excitation frequency for the first pulse train is at or within 5% of a resonant frequency of the first transceiver.

8. An integrated circuit, comprising:
a substrate having a semiconductor surface;
a processor formed on the semiconductor surface;
a non-volatile memory storing a flow measurement algorithm and instructions;
a data bus for coupling the non-volatile memory to the processor;
an address bus for coupling the non-volatile memory to the processor;
input/output (IO) pins, coupled to the data bus and the address bus for coupling to a first transducer and to a second transducer;
the processor being operable when executing the instructions to:
transmit a first pulse train to a first transducer, wherein the first transducer:
  transmits a first ultrasonic wave to a second transducer, the first ultrasonic wave propagating downstream through a fluid in a pipe section in response to receiving the first pulse train, wherein an amplitude of the first ultrasonic wave increases when receiving the first pulse train; and
  receives a second ultrasonic wave from the second transducer;
transmit a second pulse train to the second transducer, wherein the second transducer:
  transmits the second ultrasonic wave to the first transducer, the second ultrasonic wave propagating upstream through the fluid in the pipe section in response to receiving the second pulse train, wherein an amplitude of the second ultrasonic wave increases when receiving the second pulse train; and
  receives the first ultrasonic wave from the first transducer;
generate a first windowed portion of the first received ultrasonic wave and a second windowed portion of the second received ultrasonic wave;
calculate a signal delay using the first and second windowed portions; and
calculate a flow of the fluid from the calculated signal delay.

9. The integrated circuit of claim 8, wherein generating the first and second windowed portions comprises using a linearly tapered window.

10. The integrated circuit of claim 8, wherein generating the first and second windowed portions comprises using a Hanning window.

11. The integrated circuit of claim 8, wherein:
the amplitude of the first ultrasonic wave decreases when not receiving the first pulse train to form a tail portion of the first ultrasonic wave, and
generating the first windowed portion selectively removes at least a section of the tail portion.

12. The integrated circuit of claim 8, wherein the processor IC comprises a microcontroller unit (MCU).

13. An ultrasonic flowmeter, comprising:
a first transducer and a second transducer positioned on a pipe wall;
a flow electronics circuit including a transceiver coupled to a processor having an associated memory storing a flow measurement algorithm coupled to the first and second transducers for:
transmitting a first pulse train to the first transducer, wherein the first transducer:
  transmits a first ultrasonic wave to the second transducer, the first ultrasonic wave propagating downstream through a fluid in a pipe section in response to receiving the first pulse train, wherein an amplitude of the first ultrasonic wave increases when receiving the first pulse train; and
  receives a second ultrasonic wave from the second transducer;
transmitting a second pulse train to the second transducer, wherein the second transducer:
  transmits the second ultrasonic wave to the first transducer, the second ultrasonic wave propagating upstream through the fluid in a pipe section in response to receiving the second pulse train, wherein an amplitude of the second ultrasonic wave increases when receiving the second pulse train; and
  receives the first ultrasonic wave from the first transducer;
generating a first windowed portion of the first received ultrasonic wave and a second windowed portion of the second received ultrasonic wave;
calculating a signal delay using the first and second windowed portion; and
calculating a flow of the fluid from the calculated signal delay.

14. The ultrasonic flowmeter of claim 13, wherein the first and second transceivers are spaced apart from one another along a first pipe wall of an inline pipe section.

15. The ultrasonic flowmeter of claim 13, wherein generating the first and second window partitions comprises using a Hanning window.

16. The ultrasonic flowmeter of claim 13, wherein:
the amplitude of the first ultrasonic wave decreases when not receiving the first pulse train to form a tail portion of the first ultrasonic wave, and
generating the first windowed portion selectively removes at least a section of the tail portion.

17. The ultrasonic flowmeter of claim 13, wherein the processor comprises a microcontroller unit (MCU).

* * * * *